United States Patent
Ohkawa et al.

(10) Patent No.: US 9,767,375 B2
(45) Date of Patent: Sep. 19, 2017

(54) DELIVERY PROCESSING APPARATUS AND METHOD FOR RECOGNIZING INFORMATION PROVIDED ON DELIVERY TARGET ITEM

(71) Applicant: Kabushiki Kaisha Toshiba, Minato-ku (JP)

(72) Inventors: Yasuhiro Ohkawa, Fuchu (JP); Tomoyuki Hamamura, Shinagawa (JP); Bunpei Irie, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 17 days.

(21) Appl. No.: 15/050,758

(22) Filed: Feb. 23, 2016

(65) Prior Publication Data

US 2016/0259987 A1 Sep. 8, 2016

(30) Foreign Application Priority Data

Mar. 4, 2015 (JP) ................................. 2015-042842

(51) Int. Cl.
*G06K 9/00* (2006.01)
*G06K 9/03* (2006.01)
*B07C 3/10* (2006.01)
*G06K 9/18* (2006.01)

(52) U.S. Cl.
CPC ................ *G06K 9/033* (2013.01); *B07C 3/10* (2013.01); *G06K 9/00993* (2013.01); *G06K 9/03* (2013.01); *G06K 9/18* (2013.01); *B07C 2301/005* (2013.01); *G06K 2209/01* (2013.01)

(58) Field of Classification Search
CPC .... B07C 3/10; B07C 2301/005; G06K 9/033; G06K 2209/01; G06K 9/00993; G06K 9/03; G06K 9/18
USPC ........................................................ 382/101
See application file for complete search history.

(56) References Cited

FOREIGN PATENT DOCUMENTS

| JP | 2003-211095 | | 7/2003 |
|---|---|---|---|
| JP | 2003211095 | A * | 7/2003 |

\* cited by examiner

*Primary Examiner* — Gregory F Cunningham
(74) *Attorney, Agent, or Firm* — Oblon, McClelland, Maier & Neustadt, L.L.P.

(57) ABSTRACT

A delivery processing apparatus has a recognition unit and a determination unit. The recognition unit executes recognition processing for recognizing information that is provided on a delivery target item based on an image obtained by shooting an image of the delivery target item. The determination unit determines whether or not to extend the recognition processing performed by the recognition unit, based on a degree of progress of the recognition processing that has been performed by the recognition unit in a period from when the information recognition processing was started by the recognition unit until a predetermined time has elapsed, and an extension rate, which indicates a ratio of the number of times that the recognition unit has extended the recognition processing to the number of times that the recognition unit has performed the recognition processing.

12 Claims, 10 Drawing Sheets

| THE TOTAL NUMBER OF TIMES OF PROCESSING | THE NUMBER OF TIMES OF EXTENDED OCR PROCESSING | THE NUMBER OF TIMES OF VCS |
|---|---|---|
| 58 | 10 | 3 |

DELIVERY PROCESSING APPARATUS AND METHOD FOR RECOGNIZING INFORMATION PROVIDED ON DELIVERY TARGET ITEM

CROSS-REFERENCE TO RELATED APPLICATION

This application is based upon and claims the benefit of priority from Japanese Patent Application No. 2015-042842, filed on Mar. 4, 2015, the entire contents of which are incorporated herein by reference.

FIELD

An embodiment of the present invention relates to delivery processing apparatuses and methods for recognizing information provided on a delivery target item (i.e., an item to be delivered).

BACKGROUND

Conventionally known apparatuses read information that is provided on a delivery target item through OCR processing from an image obtained by shooting an image of the delivery target item. If the information cannot be read through OCR processing, the apparatus transfers the image to an external apparatus, and the external apparatus performs the OCR processing more precisely on the image. The apparatus thereby improves the accuracy of character recognition.

With the conventional technique, the external apparatus itself and an interface for communicating with the external apparatus need to be provided in order to meet the needs of users who want to perform the aforementioned processing in stages, which leads to an increase in the size of the apparatus in some cases.

DETAILED DESCRIPTION

A delivery processing apparatus according to an embodiment has a recognition unit and a determination unit. The recognition unit executes recognition processing for recognizing information that is provided on a delivery target item based on an image obtained by shooting an image of the delivery target item. The determination unit determines whether or not to extend the recognition processing performed by the recognition unit, based on a degree of progress of the recognition processing that has been performed by the recognition unit in a period from when the information recognition processing was started by the recognition unit until a predetermined time has elapsed, and an extension rate, which indicates a ratio of the number of times that the recognition unit has extended the recognition processing to the number of times that the recognition unit has performed the recognition processing.

Hereinafter, the delivery processing apparatus according to the embodiment, and a delivery processing system 1 that includes a delivery processing program will be described with reference to the drawings.

Figure 1:
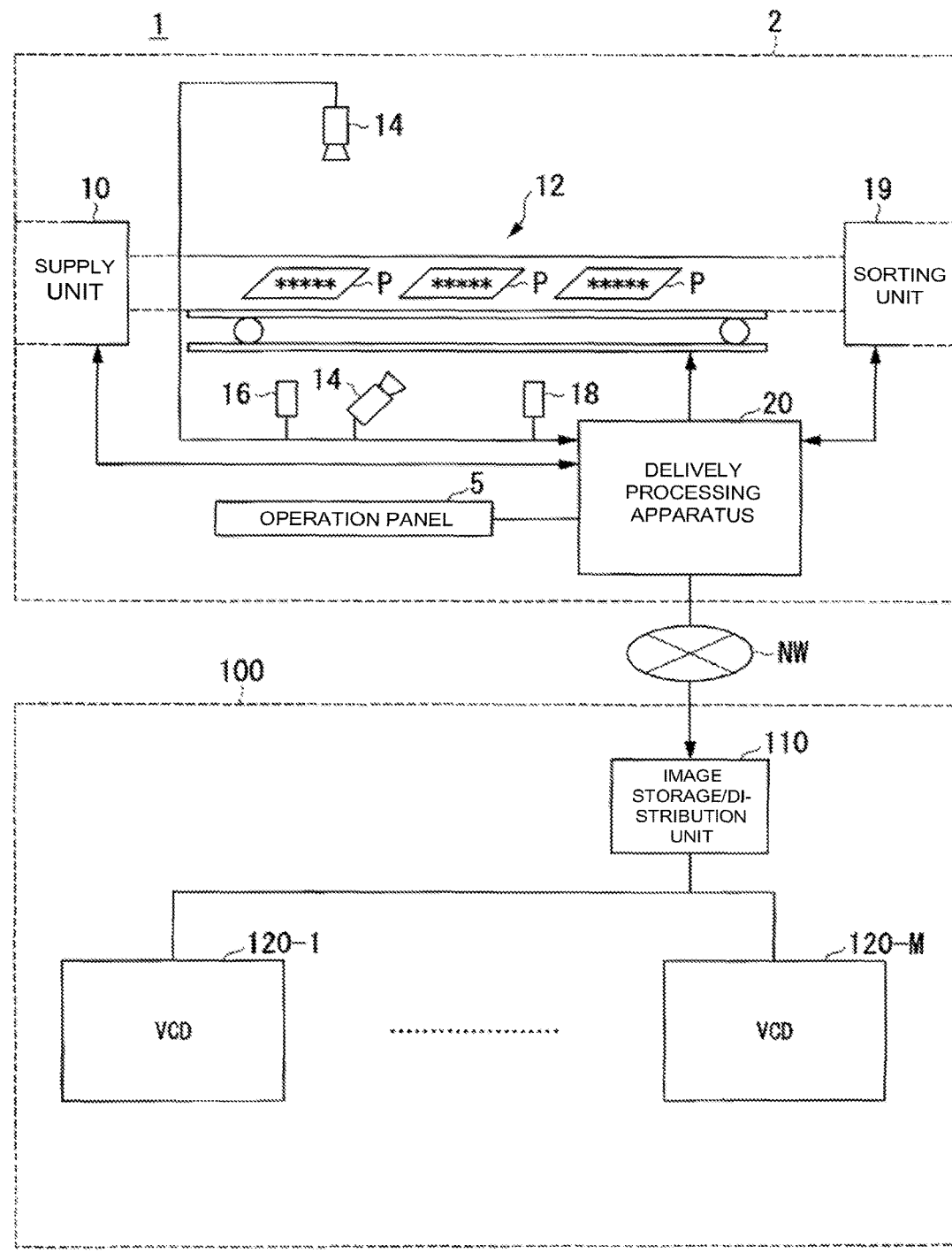
FIG. 1 is a schematic diagram of a delivery processing system 1.

FIG. 1 is a schematic diagram of the delivery processing system 1. The delivery processing system 1 is a system for sorting delivery target items (items to be delivered) P, which may include parcels, postcards, envelopes, and the like, into portions that correspond to respective delivery destinations. In the delivery processing system 1, an image of each delivery target item P, which is conveyed by a conveyance mechanism 12 including a belt conveyer, a holding belt, or the like, is captured by an image capturing unit 14, for example. In the delivery processing system 1, address information that is provided on each delivery target item P is recognized from the image captured by the image capturing unit 14, and the delivery target item P is sorted out based on the recognized address information. The address information is information that indicates an address of the delivery destination of the delivery target item P. The address information may include a name or the like.

The delivery processing system 1 includes a sorting machine body 2 and a video coding system (hereinafter referred to as a "VCS") 100. A delivery processing apparatus 20 and the VCS 100 are connected to each other by a network NW, such as a WAN (Wide Area Network) or a LAN (Local Area Network).

The sorting machine body 2 includes, for example, an operation panel 5, a supply unit 10, the conveyance mechanism 12, the image capturing unit 14, a barcode reader (hereinafter referred to as a "BCR") 16, a barcode writer (hereinafter referred to as a "BCW") 18, a sorting unit 19, and the delivery processing apparatus 20.

The operation panel 5 includes an operation unit (not shown) and a display unit (not shown). The operation unit is a device by which a user can input information. The operation unit includes an input device such as a keyboard, a mouse, a touch panel, or a microphone. The display unit is a display device such as an LCD (Liquid Crystal Display) or an organic EL (Electroluminescence) display device, for example. The display unit displays the operation status of the delivery processing system 1 or the like.

The supply unit 10 is provided on the upstream side of the conveyance mechanism 12. The delivery target items P to be conveyed to the conveyance mechanism 12 are set in the supply unit 10. The delivery target items P are set in a stacked state, for example, in the supply unit 10. The supply unit 10 includes a separation roller (not shown). The separation roller is in contact with the lower end of the set delivery target items P. As a result of the separation roller rotating in this state, the delivery target items P that are set in the supply unit 10 are taken out from the supply unit 10 and conveyed to the conveyance mechanism 12.

The conveyance mechanism 12 conveys the delivery target items P supplied from the supply unit 10 toward the sorting unit 19. The conveyance mechanism 12 includes, for example, a conveyance belt, a drive pulley, and a drive motor. The drive pulley is rotated by the driving force that is output by being driven by the drive motor. The conveyance belt is operated by the rotational force of the drive pulley to convey the delivery target items P.

The image capturing unit 14 captures an image of each delivery target item P that has arrived at an image capturing position, and outputs the captured image to the delivery processing apparatus 20. The image capturing unit 14 has an illumination, and a scanner of a line scanning type with which an image of each moving delivery target item P can be shot with a high resolution, for example. The illumination emits light to each delivery target item P conveyed by the conveyance mechanism 12. By arranging a plurality of image capturing units 14 at positions at which an image of each delivery target item P can be shot from different angles, for example, the plurality of image capturing units 14 can capture images of respective surfaces of each delivery target item P. Note that the image capturing unit 14 may include a camera capable of simultaneously shooting an image of a predetermined plane area, or may include a video camera, for example.

The BCR 16 reads an ID barcode that includes identification information provided on each delivery target item P and an address barcode that includes the address information about the delivery target item P, and also recognizes the identification information and the address information by decoding the read information. The BCR 16 outputs the recognized information to the delivery processing apparatus 20.

The BCW 18 prints the ID barcode or the address barcode on the delivery target item P based on an instruction from the delivery processing apparatus 20. For example, the BCW 18 prints, on a delivery target item P whose address information has been recognized by the delivery processing apparatus 20, the address barcode obtained by encoding the address information that is the recognition result. The BCW 18 also prints the ID barcode obtained by encoding the identification information on a delivery target item P for which address recognition was not completed. The delivery processing apparatus 20 holds a correspondence relationship between a result of later-described video coding and the identification information.

The sorting unit 19 is provided on the downstream side of the conveyance mechanism 12. The sorting unit 19 includes, for example, a plurality of sorting pockets (not shown) that are demarcated in a plurality of steps and a plurality of lines, an extension pocket, and a VCS pocket (not shown). The sorting unit 19 conveys and accumulates each delivery target item P into a sorting pocket that corresponds to an instructed sorting destination based on an instruction from the delivery processing apparatus 20. Delivery target items P on which later-described extended OCR processing has been performed are accumulated in the extension pocket. Delivery target items P on which video coding has been performed are accumulated in the VCS pocket. The extension pocket and the VCS pocket may be integrated into one pocket. The delivery target items P accumulated in the extension pocket or the VCS pocket are returned to the supply unit 10. Regarding each delivery target items P that has been returned to the supply unit 10, the sorting pocket that is to be the conveyance destination thereof is determined based on the ID barcode printed by the aforementioned BCW 18.

The VCS 100 is a system that displays the image of the delivery target item P whose address information cannot be recognized by the delivery processing apparatus 20 on a display unit, and assists address information recognition by means of a visual check of a human. The VCS 100 includes an image storage/distribution unit 110, and video coding desks (hereinafter referred to as "VCDs") 120-1 to 120-M. These VCDs will be hereinafter referred to simply as VCDs 120 in the case of not specially distinguishing the VCD 120-1 to VCD 120-M from one another. The sorting machine body 2 and each VCD 120 are connected to the image storage/distribution unit 110. The image storage/distribution unit 110 receives information for video coding (coding data) that includes the image of each delivery target item P which is output from the delivery processing apparatus 20. The image of the delivery target item P that is output from the delivery processing apparatus 20 is output to the VCS 100 if the address information thereof cannot be recognized by the delivery processing apparatus 20. The image storage/distribution unit 110 monitors the operating status of the VCDs 120, and distributes the coding data to the VCD 120 in accordance with the operation status of the VCDs 120. Note that the coding data includes the image of the delivery target item P and a result of the address information recognition performed by the delivery processing apparatus 20.

Figure 2:
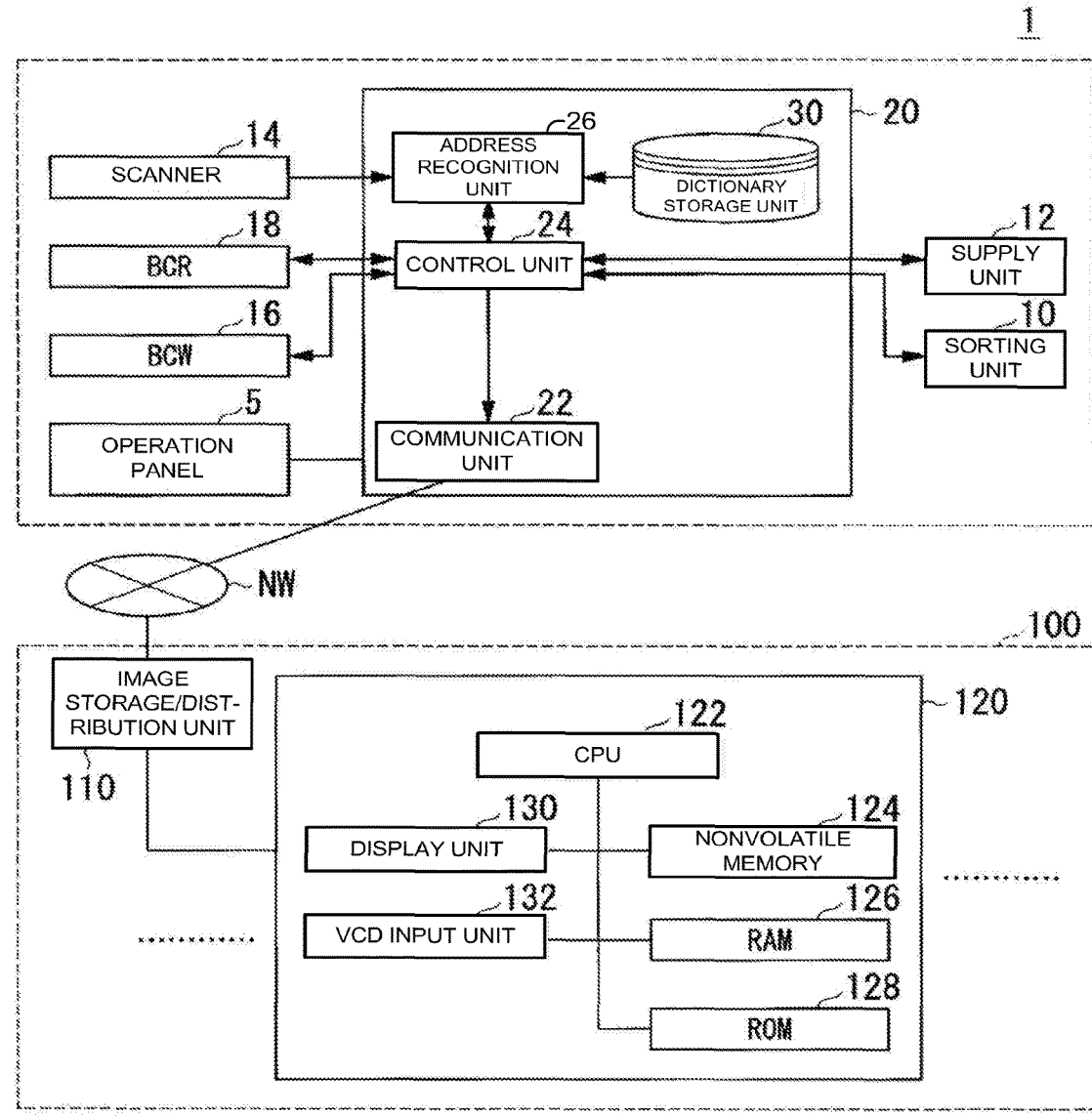
FIG. 2 is a diagram showing an exemplary functional configuration of the delivery processing system 1.

FIG. 2 is a diagram showing an exemplary functional configuration of the delivery processing system 1. The VCDs 120 will be described first. Each VCD 120 includes a CPU (Central Processing Unit) 122, a nonvolatile memory 124, a RAM (Random Access Memory) 126, a ROM (Read Only Memory) 128, a display unit 130, and a VCD input unit 132. The VCD 120 causes the display unit 130 to display images of the delivery target items P whose address information cannot be recognized by the delivery processing apparatus 20, and prompts the user to input the address information (character information).

The CPU 122 controls each part to perform various kinds of processing based on control programs and information that are stored in the nonvolatile memory 124 or the ROM 128. Control data and various kinds of data are stored in the nonvolatile memory 124 in accordance with the purpose of using the VCD 120. The nonvolatile memory 124 stores the coding data that is output from the image storage/distribution unit 110, for example. The nonvolatile memory 124 stores input information that is input to the VCD input unit 132 by an operator, for example.

The RAM 126 temporarily stores data processed by the CPU 122. Control programs and control data are stored in advance in the ROM 128. The display unit 130 displays the coding data that is output from the image storage/distribution unit 110, for example. The display unit 130 may also display the address information recognized by the delivery processing apparatus 20, for example. The VCD input unit 132 is a device with which the user inputs the character information that is the address information included in the image displayed on the display unit 130. The information that is input by the VCD input unit 132 is transmitted to the delivery processing apparatus 20 via the image storage/distribution unit 110.

The delivery processing apparatus 20 will be described below. The delivery processing apparatus 20 includes a communication unit 22, a control unit 24, an address recognition unit 26, and a dictionary storage unit 30. The dictionary storage unit 30 is achieved by a ROM (Read Only Memory), a HDD, a flash memory, or the like. A dictionary for recognizing characters and an address database are stored in the dictionary storage unit 30. The delivery processing apparatus 20 is connected to the network NW via the communication unit 22. The communication unit 22 includes a communication interface to be connected to the network NW.

The control unit 24 performs various kinds of control for each part of the delivery processing apparatus 20. The control unit 24 sorts each delivery target item P by controlling the sorting unit 19 based on a result of recognition of the image by the address recognition unit 26, or information acquired from the image storage/distribution unit 110, for example. The control unit 24 controls the BCR 18 to cause the BCR 18 to read the ID barcode and the address barcode that are printed on the delivery target item P, and cause the BCR 18 to recognize the identification information and the address information. The control unit 24 controls the BCW 16 and causes the BCW 16 to print the ID barcode or the address barcode on the delivery target item P in accordance with the result of recognition of the image recognized by the address recognition unit 26, for example.

Figure 3:
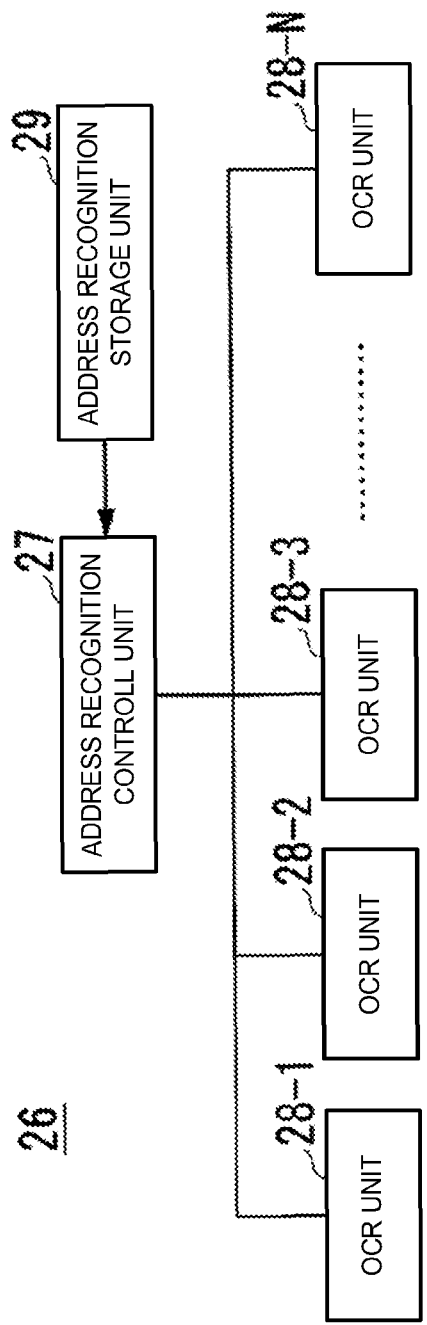
FIG. 3 is a diagram for illustrating a functional configuration of an address recognition unit 26.

FIG. 3 is a diagram for illustrating a functional configuration of the address recognition unit 26. The address recognition unit 26 includes an address recognition control unit 27, OCR units 28-1 to 28-N, and an address recognition storage unit 29. Hereinafter, those OCR units will be referred to simply as the OCR units 28 when not specially distinguishing the OCR units 28-1 to 28-N from one another. The upper limit number of OCR units 28 is determined in advance. The delivery processing apparatus 20 includes CPU cores of a multi-core processor, which has a plurality of cores in a single package, and an ROM which stores a program, for example. The address recognition control unit 27 and the OCR units 28 are achieved by the CPU cores of a multi-core processor executing the program stored in the ROM. Note that the present invention is not limited thereto, and the address recognition control unit 27 and the OCR units 28 may be achieved by processors of a multi-processor device and the program, or may be achieved by switching the role of a single CPU or the like in a time division manner.

The address recognition control unit 27 monitors the processing status of the OCR units 28 and integrally controls the OCR units 28. The address recognition control unit 27 acquires a recognition processing result that is output from each OCR unit 28, and extends the recognition processing performed by the OCR unit 28 or stops the recognition processing based on the acquired recognition processing result. For example, the address recognition control unit 27 determines whether or not to extend the recognition processing performed by the OCR unit 28 based on a degree of progress of the recognition processing performed by the OCR unit 28 in a period from when the recognition processing was started by the OCR unit 28 until a predetermined time has elapsed, and an extension rate, which indicates a ratio of the number of times that the OCR unit 28 has extended the recognition processing. That is to say, the address recognition control unit 27 is a determination unit.

The OCR unit 28 performs processing for recognizing information provided on the delivery target item based on an image obtained by capturing the image of the delivery target item. The OCR unit 28 extracts an area in which the address information is written (hereinafter, an "address area") from the image of the delivery target item P captured by the image capturing unit 14, and performs processing for recognizing the address information included in the address area with references to the information stored in the dictionary storage unit 30, for example. The OCR unit 28 outputs a result of the processing for recognizing the address information to the address recognition control unit 27. The OCR unit 28 may also sequentially output information indicating the degree of progress of the recognition processing to the address recognition control unit 27. Note that the OCR unit 28 may output the result of the recognition processing and the degree of progress of the recognition processing to the address recognition control unit 27 in response to an instruction from the address recognition control unit 27.

If the recognition processing reaches a predetermined degree of progress (first reference value) in a period from when the recognition processing was started until a first predetermined time has elapsed, the OCR unit 28 is controlled by the address recognition control unit 27 so as to end the recognition processing at this time point. The recognition processing within the first predetermined time will be referred to as normal OCR processing. The first predetermined time refers to a time with which each delivery target item P can be conveyed to the sorting pocket in time if the recognition processing is completed within the first predetermined time after the recognition processing is started. Accordingly, if the recognition processing is completed within the first predetermined time after the recognition processing is started, the delivery target item P is conveyed to the sorting pocket. On the other hand, if the recognition processing is completed after the first predetermined time elapsed after the recognition processing was started, the delivery target item P is conveyed not to the sorting pocket but to the extension pocket, and is again returned to the supply unit 10. Accordingly, if the recognition processing is completed with the normal OCR processing, the time and effort of again performing the processing on the delivery target item P are saved, and quick processing is achieved.

If the recognition processing does not reach the predetermined degree of progress but reaches a degree of progress (second reference value) that is lower than the predetermined degree of progress within the first predetermined time, the OCR unit 28 is controlled by the address recognition control unit 27 so as to extend the recognition processing to perform the recognition processing. This extended recognition processing will be referred to as extended OCR processing.

If the recognition processing does not proceed up to the second reference value within the first predetermined time, or in the case where, as a result of performing the extended OCR processing, the extended OCR processing does not reach a predetermined degree of progress, which may be the same as, or different from, the criterion at the time when the first predetermined time elapsed, within the second predetermined time, the address recognition control unit 27 causes the OCR unit 28 to stop the recognition processing, and transmits the image to the VCS 100 to cause the VCS 100 to execute video coding. As a result, an address that cannot be recognized by computer processing can be recognized by a visual check of a human, and an ultimate recognition rate can be improved.

The second predetermined time is set to a time such that the degree of recognition does not significantly increase even if the recognition processing is continued for the second predetermined time or longer. If the recognition processing is completed by the extended OCR processing, the delivery target item P is conveyed not to the sorting pocket but to the extension pocket and returned to the supply unit 10, and thereafter, the delivery target item P is conveyed to the sorting pocket without the video coding being performed therefor. Accordingly, by performing the extended OCR processing, it is possible to reduce the frequency of the video coding and reduce the manpower necessary for the video coding.

The address recognition storage unit 29 is set in a specific area in a storage device such as a RAM, for example. A count value for each type of processing executed by the address recognition control unit 27 is stored in the address recognition storage unit 29. Count values of the total number of times of processing, the number of times of the extended OCR processing, the number of times of VCS, or the like, which will be described later, are stored in the address recognition storage unit 29.

Figure 4:
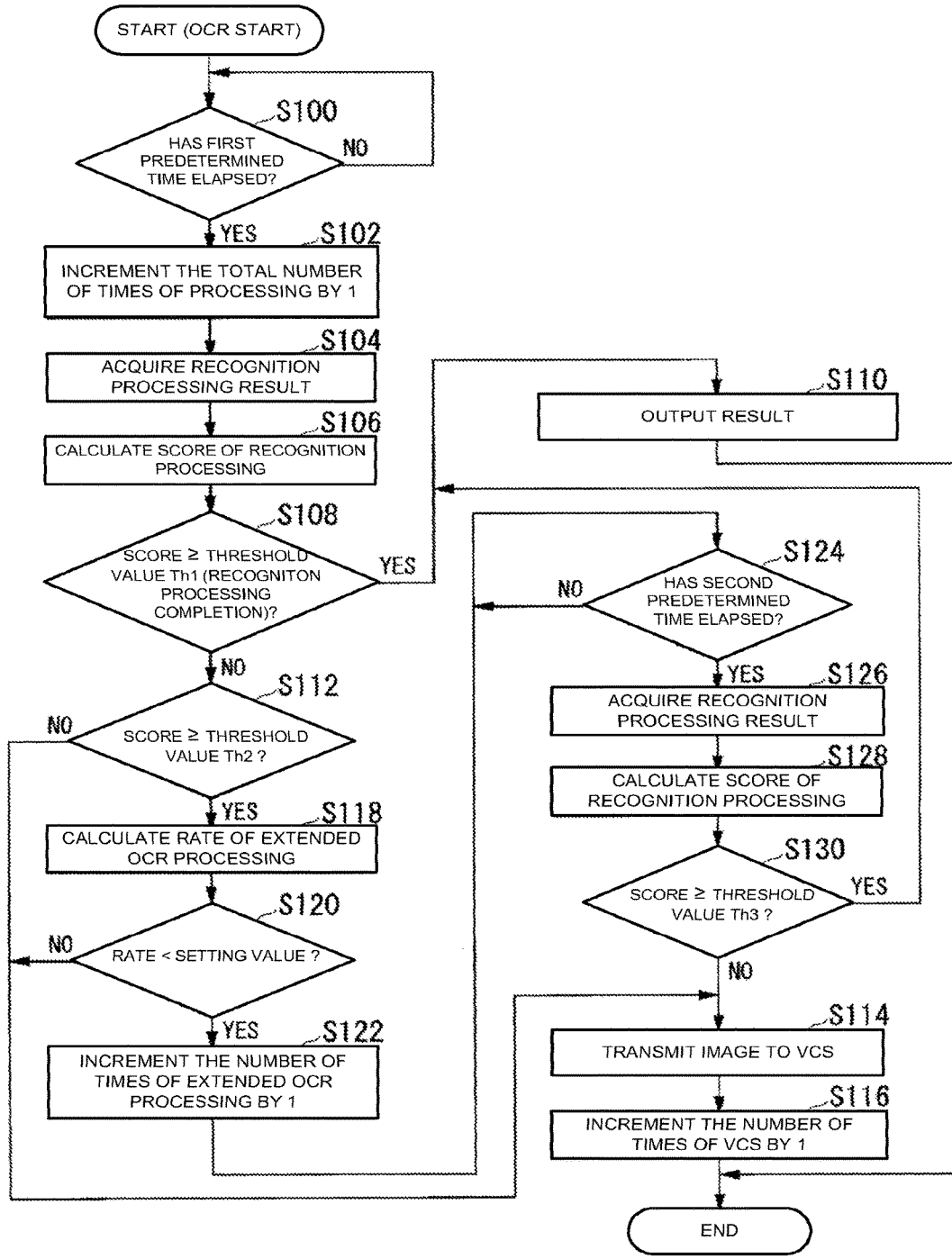
FIG. 4 is a flowchart showing a flow of recognition processing executed by an address recognition control unit 27.

FIG. 4 is a flowchart showing a flow of the recognition processing executed by the address recognition control unit 27. The processing of this flowchart is executed for each OCR unit 28, and is started by the address recognition control unit 27 giving the OCR unit 28 an instruction to execute the recognition processing.

Initially, the address recognition control unit 27 waits until the first predetermined time elapses after the OCR unit 28 starts the processing for recognizing the address information included in the image of the delivery target item P (step S100). If the first predetermined time has elapsed, the address recognition control unit 27 increments the total number of times of processing by 1 (step S102).

Next, the address recognition control unit 27 acquires a recognition processing result at this time point from the OCR unit 28 (step S104). The recognition processing result acquired by the address recognition control unit 27 may include a degree of difficulty, which indicates the difficulty in address recognition, or the like. The degree of difficulty may be calculated by dividing the degree of achievement of the recognition processing by the time from when the recognition of the delivery target item P was started by the OCR unit 28 until the first predetermined time has elapsed, or may be calculated based on information regarding noise of the image, information such as the number of written characters, or the like. The degree of difficulty may also be calculated using any known method. The address recognition control unit 27 may acquire the information regarding noise of the image or information such as the number of written characters.

Next, the address recognition control unit 27 calculates a score of the recognition processing from the recognition processing result acquired from the OCR unit 28 in step S104 (step S106). The address recognition control unit 27 calculates the score from an average, a weighted average, a largest value, a smallest value, or the like of a probability of the recognition result for each character that is included in the recognition processing result acquired in the processing in step S104. Note that since various methods for calculating the score are known, detailed descriptions thereof will be omitted.

Next, the address recognition control unit 27 determines whether or not the score calculated in step S106 is larger than or equal to a threshold value Th1 (step S108). If the score calculated in step S106 is larger than or equal to the threshold value Th1 (i.e., if the degree of progress is larger than or equal to the first reference value), the address recognition control unit 27 determines that the address information recognition processing has been completed. If the score is smaller than the threshold value Th1, the address recognition control unit 27 determines that the address information recognition processing has not been completed.

If the score calculated in step S106 is larger than or equal to the threshold value Th1, the address recognition control unit 27 stops the recognition processing and outputs the address information, which is the recognition result, to the control unit 24 (step S110). On the other hand, if the score calculated in step S106 is smaller than the threshold value Th1, the address recognition control unit 27 determines whether or not the score calculated in step S106 is larger than or equal to a threshold value Th2 (step S112).

If the score calculated in step S106 is smaller than the threshold value Th2, the address recognition control unit 27 stops the recognition processing, transmits the image of the delivery target item P to the VCS 100 to cause the VCS 100 to perform the video coding (step S114), and increments the number of times of VCS stored in the address recognition storage unit 29 by 1 (step S116).

If the score calculated in step S106 is larger than or equal to the threshold value Th2 (i.e., if the degree of progress is larger than or equal to the second reference value), the address recognition control unit 27 calculates a rate of the number of times of the extended OCR processing executed (an extension rate of the extended OCR processing) (step S118). The extension rate a is calculated by Equation (1), for example. In the equation, A denotes the total number of times of the processing, and E denotes the number of times of the extended OCR processing. 1 is added to the numerator because the equation is for predicting a result in the case of executing the extended OCR processing at this time.

$$\alpha=(1+E)/A \quad (1)$$

In place of the aforementioned Equation (1), the address recognition control unit 27 may obtain the extension rate a by simply dividing the number of times of the extended OCR processing by the total number of times of processing, as indicated by Equation (2), for example.

$$\alpha=E/A \quad (2)$$

In place of the aforementioned Equation (1), the address recognition control unit 27 may obtain the extension rate a by dividing the number of times of the extended OCR processing by a value obtained by subtracting the number of times of the VCS from the total number of times of processing, as indicated by Equation (3), for example. In the equation, VCS denotes the number of times of the VCS.

$$\alpha=E/(A-VCS) \quad (3)$$

Next, the address recognition control unit 27 determines whether or not the ratio of the number of times of the extended OCR processing calculated in step S118 is smaller than a set value (step S120). If the ratio of the number of times of the extended OCR processing calculated in step S118 is larger than or equal to the set value, the address recognition control unit 27 stops the recognition processing, transmits the image of the delivery target item P to the VCS 100 to cause the VCS 100 to perform the video coding (step S114), and increments the number of times of the VCS stored in the address recognition storage unit 29 by 1 (step S116).

If the rate of the extended OCR processing calculated in step S118 is smaller than the set value, the address recognition control unit 27 increments the number of times of the extended OCR processing by 1 (step S122). Next, the address recognition control unit 27 waits until a second predetermined time further elapses (step S124). If the second predetermined time has elapsed, the address recognition control unit 27 acquires a recognition processing result from the OCR unit 28 (step S126). Next, the address recognition control unit 27 calculates the score of the recognition processing from the recognition processing result acquired from the OCR unit 28 (step S128).

Next, the address recognition control unit 27 determines whether or not the score calculated in step S128 is larger than or equal to a threshold value Th3 (step S130). If the score calculated in step S128 is larger than or equal to the threshold value Th3 (i.e., if the degree of progress is larger than or equal to a third reference value), the address recognition control unit 27 stops the recognition processing and outputs the address information, which is a recognition result, to the control unit 24 (step S110). On the other hand, if the score calculated in step S128 is smaller than the threshold value Th3, the address recognition control unit 27 stops the recognition processing, transmits the image of the delivery target item P to the VCS 100 to cause the VCS 100 to perform the video coding (step S114), and increments the number of times of the VCS stored in the address recognition storage unit 29 by 1 (step S116). Thus, the processing in this flowchart ends.

Figures 5, 6:
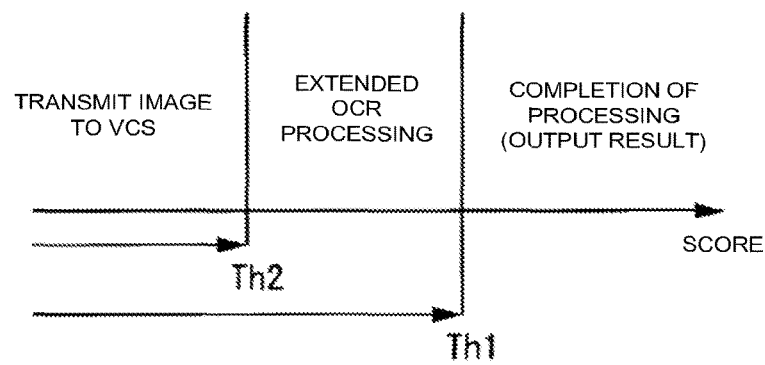
FIG. 5 is a diagram showing exemplary count values of respective kinds of processing stored in an address recognition storage unit 29.
FIG. 6 is a diagram showing criteria for determination at the time when a first predetermined time has elapsed.

FIG. 5 is a diagram showing exemplary count values of the respective kinds of processing stored in the address recognition storage unit 29. The total number of times of processing, the number of times of the extended OCR processing, and the number of times that the image of the delivery target item P has been transmitted to the VCS 100 are stored in the address recognition storage unit 29.

FIG. 6 is a diagram showing criteria for determination at the time when the first predetermined time has elapsed. The threshold value Th1 is set to a higher value than the threshold value Th2 (or lower in the case where a lower score value indicates a higher degree of progress). If the score of the recognition processing at the time when the first predetermined time has elapsed is larger than or equal to the threshold value Th1, the address recognition control unit 27 determines that the recognition processing has been completed. On the other hand, if the score of the recognition processing at the time when the first predetermined time has elapsed is smaller than the threshold value Th1 and larger than or equal to the threshold value Th2, the address recognition control unit 27 causes the OCR unit 28 to execute the extended OCR processing. If the degree of achievement of the recognition processing at the time when the first predetermined time has elapsed is smaller than the threshold value Th2, the address recognition control unit 27 causes the OCR unit 28 to stop the recognition processing and causes the VCS 100 to perform the video coding.

Figure 7:
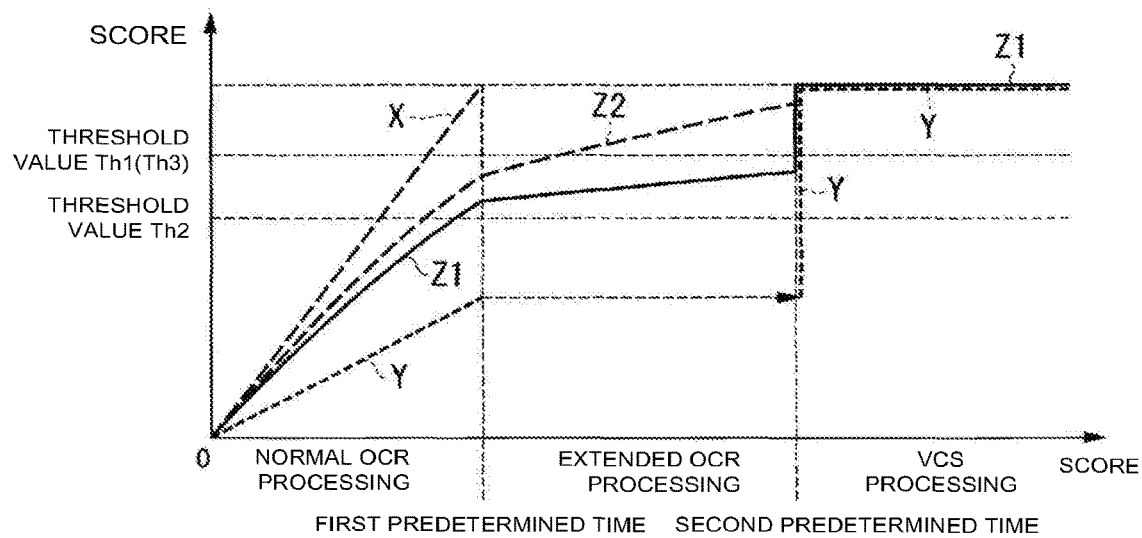
FIG. 7 is a diagram showing a relationship between an elapsed time and a degree of progress in recognition processing.

FIG. 7 is a diagram showing a relationship between an elapsed time and a degree of progress in recognition processing. In the diagram, the vertical axis indicates the score calculated from the result of the recognition processing performed by the address recognition control unit 27, and the horizontal axis indicates time. Note that it is assumed in the following description that the threshold value Th1 and the threshold value Th3 are the same value.

(1) A transition line X indicates transition in the case where the score is larger than or equal to the threshold value Th1 at the time point when the first predetermined time has elapsed. In this case, the address recognition control unit 27 determines that the address information recognition processing has been completed, gives the OCR unit 28 an instruction to stop the recognition processing, and outputs the address information, which is the recognition processing result, to the control unit 24.

(2) A transition line Y indicates transition in the case where the score is smaller than the threshold value Th2 at the time point when the first predetermined time has elapsed. In this case, the address recognition control unit 27 gives the OCR unit 28 an instruction to stop the recognition processing without executing the extended OCR processing, and causes the VCS 100 to perform the video coding. As a result, the address information is defined by the video coding.

(3) Transition lines Z1 and Z2 indicate transition in the case where the degree of progress is larger than or equal to the threshold value Th2 and smaller than the threshold value Th1 at the time point when the first predetermined time has elapsed. In this case, the address recognition control unit 27 extends the recognition processing until the second predetermined time has elapsed. If the score at the time point when the second predetermined time has elapsed is smaller than the threshold value Th3 as indicated by the transition line Z1, the address recognition control unit 27 gives the OCR unit 28 an instruction to stop the recognition processing, and causes the VCS 100 to perform the video coding. As a result, the address information is defined by the video coding.

(4) If the degree of progress is larger than or equal to the threshold value Th3 at the time point when the second predetermined time has elapsed as indicated by the transition line Z2, the address recognition control unit 27 gives the OCR unit 28 an instruction to stop the recognition processing, and outputs the address information, which is the recognition processing result, to the control unit 24.

With the above-described processing in FIG. 4, for example, if there is the need of the user for suppressing the rate of the number of times of the extended OCR processing so as to be smaller than the set value, this need can be met. In addition, regarding a delivery target item P for which the recognition processing can be completed if time is taken therefor, by causing the OCR unit 28 provided in the delivery processing apparatus 20 to extend the recognition processing, the recognition processing can be completed without asking an external apparatus for processing. As a result, the size of the delivery processing apparatus 20 (or the delivery processing system 1) can be reduced. That is to say, the size of the delivery processing apparatus 20 can be reduced while meeting the need of the user.

Note that in the processing in this flowchart, the address recognition control unit 27 waits until the first predetermined time elapses after the OCR unit 28 starts the processing for recognizing the address information provided on the image of the delivery target item P. However, if the OCR unit 28 completes the processing for recognizing the address information provided on the delivery target item P before the first predetermined time elapses, the OCR unit 28 may end the recognition processing and output information indicating that the recognition processing has ended to the address recognition control unit 27.

The processing in this flowchart has been described as processing executed by the address recognition control unit 27. However, the processing excluding the processing for incrementing the number of times of execution of the respective types of processing by 1 in steps S102, S116, and S122, for example, may be executed by the OCR unit 28, and the OCR unit 28 may notify the address recognition control unit 27 of an execution result including the degree of progress of the recognition processing, for example.

Figure 8:
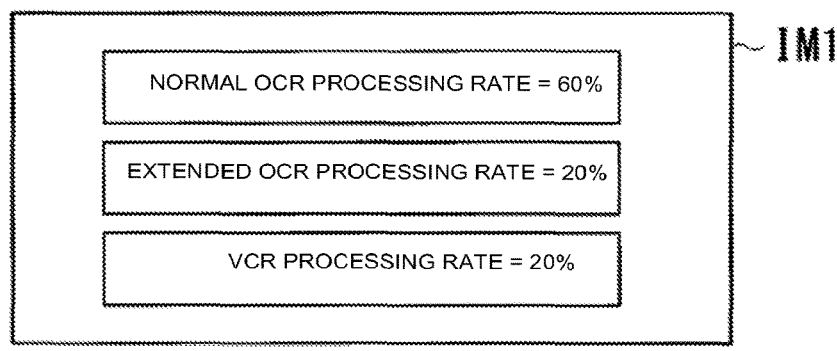
FIG. 8 shows an exemplary image IM1 displayed on a display unit of an operation panel 5.

The normal OCR processing rate, the extended OCR processing rate, and the VCS processing rate are displayed on the display unit of the operation panel 5, for example. FIG. 8 is an exemplary image IM1 displayed on the display unit of the operation panel 5. The address recognition control unit 27 causes the display unit to display the normal OCR processing rate, the extended OCR processing rate (extension rate), or the VCS processing rate in real time, for example. In this embodiment, the normal OCR processing rate is obtained by dividing, by the total number of times of processing, a value obtained by subtracting the number of times of the extended OCR processing and the number of times of the VCS processing from the total number of times of processing. The VCS processing rate is a value obtained by dividing the number of times of the VCS processing by the total number of times of processing. The user can thereby accurately find the status of the processing performed for the delivery target item P by the delivery processing apparatus 20.

Figure 9:
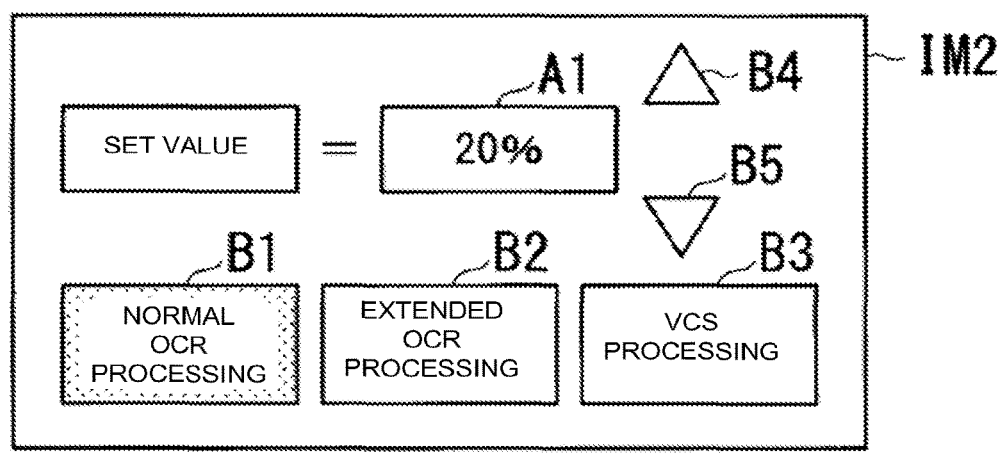
FIG. 9 shows another exemplary image displayed on the display unit of the operation panel 5.

The address recognition control unit 27 may change the set values for executing the respective types of processing based on the input information that is input via the input unit of the operation panel 5. FIG. 9 is another exemplary image displayed on the display unit of the operation panel 5. The display of the operation panel 5 is a touch panel that functions as a input unit to receive an input, for example. In an image IM2, A1 denotes a set upper limit ratio. The user can change the upper limit or lower limit rate of the normal OCR processing by operating a button B1, for example. The user can increase and decrease the set value by operating a button B4 or a button B5, for example. The user can change the upper limit ratio of the extended OCR processing by operating a button B2. The user can change the upper limit ratio of the VCS processing by operating a button B3.

Figure 10:
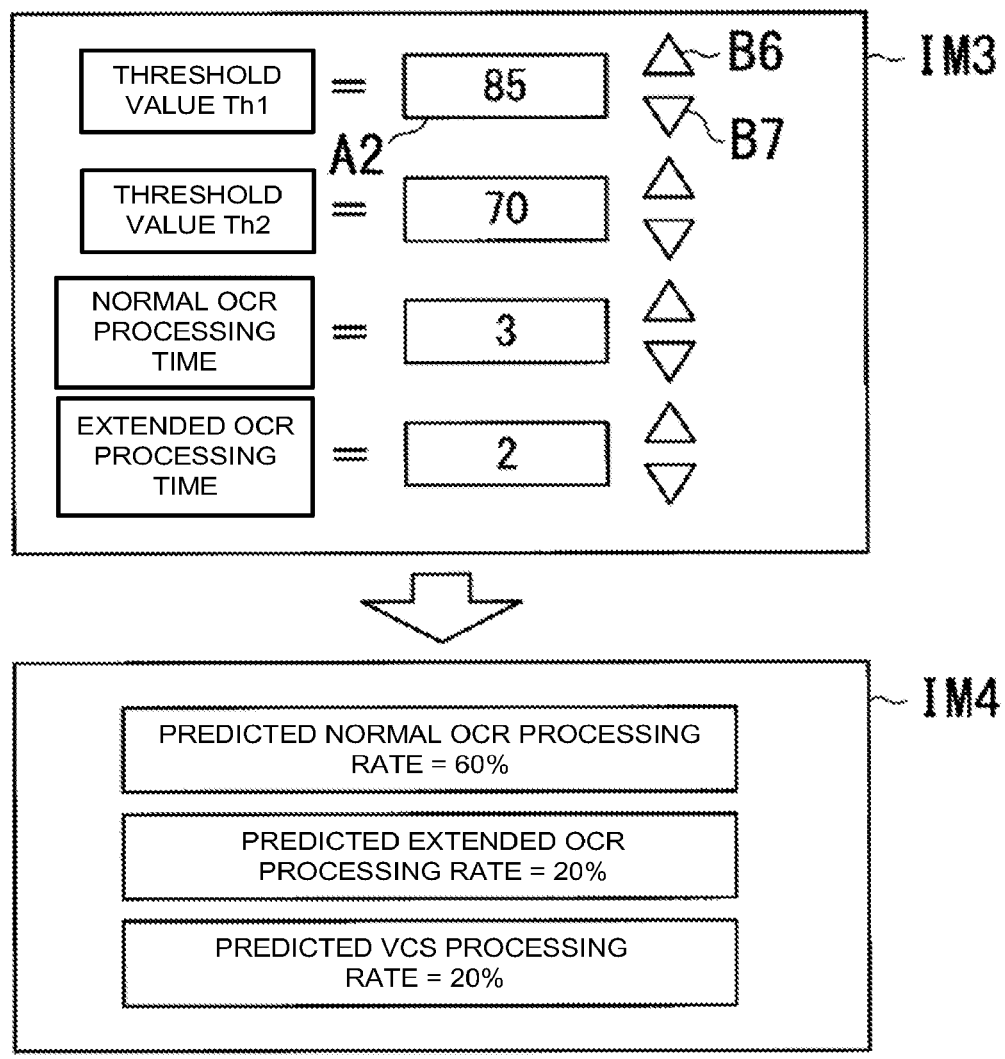
FIG. 10 shows an exemplary image that indicate settings of threshold values and a processing time displayed on the display unit of the operation panel 5.

The address recognition control unit 27 may change the threshold value (any or all of Th1, Th2, and Th3) for determining whether or not to execute the extended OCR processing or the processing for transmitting the image to the VCS 100, based on the input information that is input via the input unit of the operation panel 5. The address recognition control unit 27 may change the processing time (first predetermined time) for executing the normal OCR processing or the processing time (second predetermined time) for executing the extended OCR processing, based on the input information that is input via the input unit of the operation panel 5. FIG. 10 is an exemplary image indicating settings of the threshold values and the processing time that are displayed on the display unit of the operation panel 5. In an image IM3, A2 denotes the set threshold value Th1. The user can increase and decrease the set value of the threshold value Th1 by operating a button B6 or a button B7, for example. The method for changing the threshold value Th2, the time for executing the normal OCR processing, and the time for executing the extended OCR processing is the same as the method for changing the threshold value Th1.

When the user executes operational input for changing any of the set values on the input unit, a predicted processing rate of each type of processing in the case of changing the selected set value may be displayed, as shown in the image IM4. In this case, the address recognition control unit 27 performs a simulation using data that is acquired in advance (e.g., images of past delivery target items P) and calculates the predicted processing rate at which each type of processing is executed.

Figure 11:
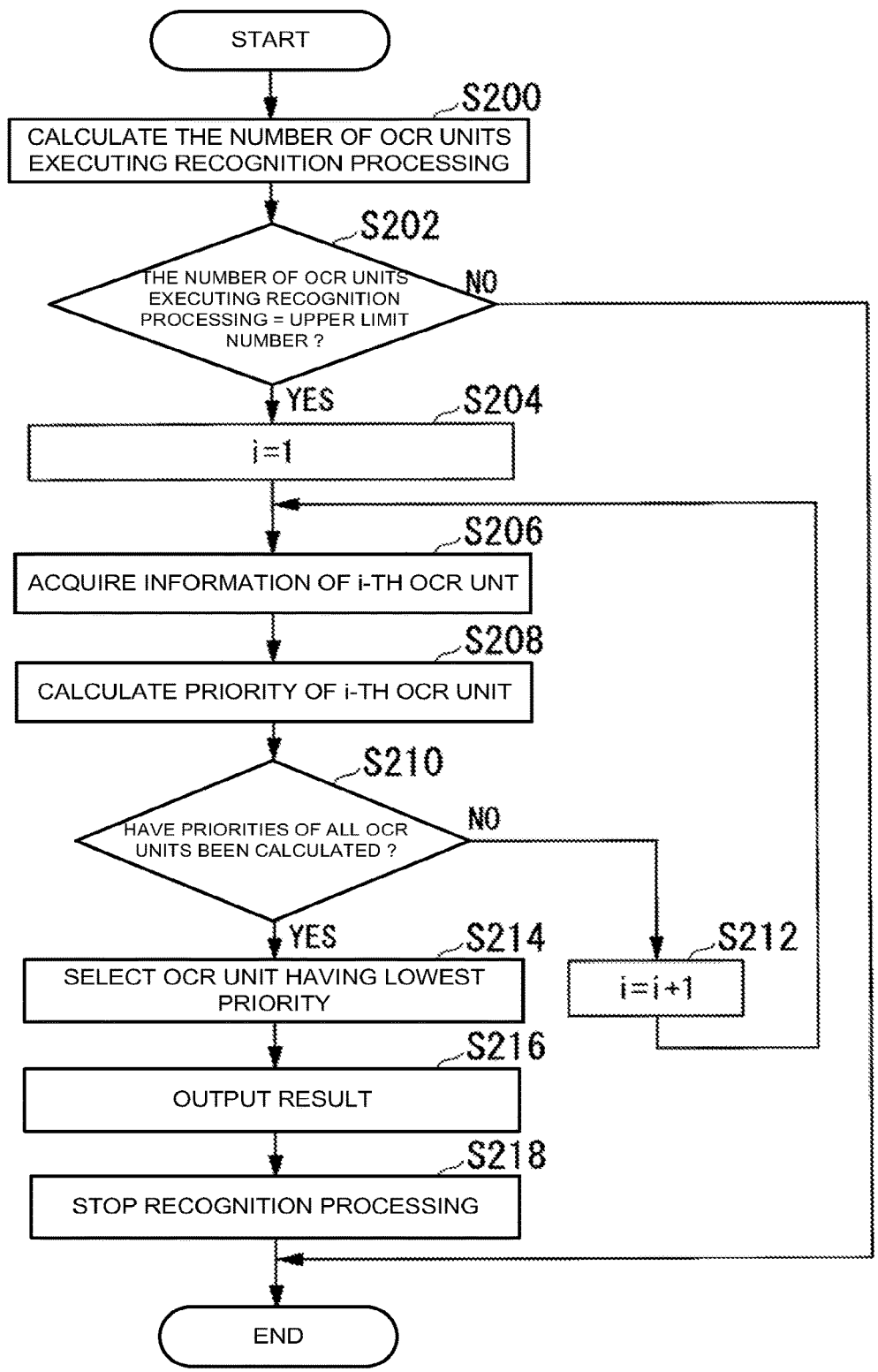
FIG. 11 is a flowchart showing a flow of recognition processing stop executed by the address recognition control unit 27.

Note that, if a request for processing for recognizing a new delivery target item P is made in a state where all OCR units 28 are operating in parallel with the processing illustrated in the flowchart in FIG. 4, the address recognition control unit 27 may perform control for stopping a single recognition process and starting the processing for recognizing the new delivery target item P. FIG. 11 is a flowchart illustrating a flow of recognition processing stop that is executed by the address recognition control unit 27.

Initially, the address recognition control unit 27 acquires recognition processing status from the OCR units 28, and calculates the number of OCR units 28 that are executing the recognition processing from the acquired recognition processing status (step S200). Next, the address recognition unit 26 determines whether or not the number of OCR units 28 that are executing the recognition processing is equal to the upper limit number of OCR units 28 (step S202). If the number of OCR units 28 that are executing the recognition processing is not equal to the upper limit number (i.e., the number of OCR units 28 that are executing the recognition processing is smaller than the upper limit number), the processing of this flowchart ends. If the number of OCR units 28 that are executing the recognition processing is equal to the upper limit number, the address recognition control unit 27 performs processing for selecting the OCR units 28 having a low priority (steps S204 to S218).

Initially, the address recognition control unit 27 sets 1 to a variable i (step S204). i is a variable indicating the number of OCR units 28 that are executing the recognition processing. Here, it is assumed that each OCR unit 28 is assigned an ID number, which is a serial number starting from 1. Next, the address recognition control unit 27 acquires information regarding an i-th OCR unit 28 (step S206). Next, the address recognition control unit 27 calculates the priority of the i-th OCR unit 28 (step S208). The information regarding the i-th OCR unit 28 acquired by the address recognition control unit 27 is the same as the information acquired in the aforementioned step S104. The address recognition control unit 27 calculates the priority from an average, a weighted average, a largest value, a smallest value, or the like of the probability of a result of recognition of characters included in the information regarding the i-th OCR unit 28 acquired in step S206.

Next, the address recognition control unit 27 determines whether or not the priority of all OCR units 28 has been calculated (step S210). If the priority of all OCR units 28 has not been calculated, the address recognition control unit 27 increments the variable i by 1 (step S212) and returns to the processing in step S206.

If the priority of all OCR units 28 has been calculated, the address recognition control unit 27 selects the OCR unit 28 having a lowest priority (step S214). The address recognition control unit 27 acquires address information recognized by the selected OCR unit 28, outputs the acquired address information to the control unit 24 (step S216), and gives the selected OCR unit 28 an instruction to stop the recognition processing (step S218). Thus, the processing in this flowchart ends.

With the above-described processing in FIG. 11, if a request for processing for recognizing a new delivery target item P is made when all OCR units 28 are operating, the address recognition control unit 27 calculates the priority of each OCR unit 28 and causes an OCR unit 28 whose calculated priority is low to stop the recognition processing. As a result, it is possible to suppress the number of operating OCR units 28 so as not to exceed the upper limit number, and recognize the address information provided on the delivery target item P.

Note that if the recognition processing is stopped, a result of the recognition processing at the time point when the recognition processing is stopped is stored in the address recognition storage unit 29. In this case, the result of the recognition processing is stored in the address recognition storage unit 29 in association with ID information that corresponds to the ID barcode provided on the delivery target item P by the BCW 18, for example. If the delivery target item P is resupplied to the supply unit 10, the OCR unit 28 references the recognition processing result at the time point when the processing for recognizing the delivery target item P is stopped, the result being stored in the address recognition storage unit 29, and executes the recognition processing. If the recognition processing of the OCR unit 28 is stopped in the processing in step S218, the number of times that the normal OCR processing has been executed or the number of times that the extended OCR processing has been executed is incremented by 1 based on the time from the time when the recognition processing was started until stopped (FIG. 4; step S102 and step S122).

Figure 12:
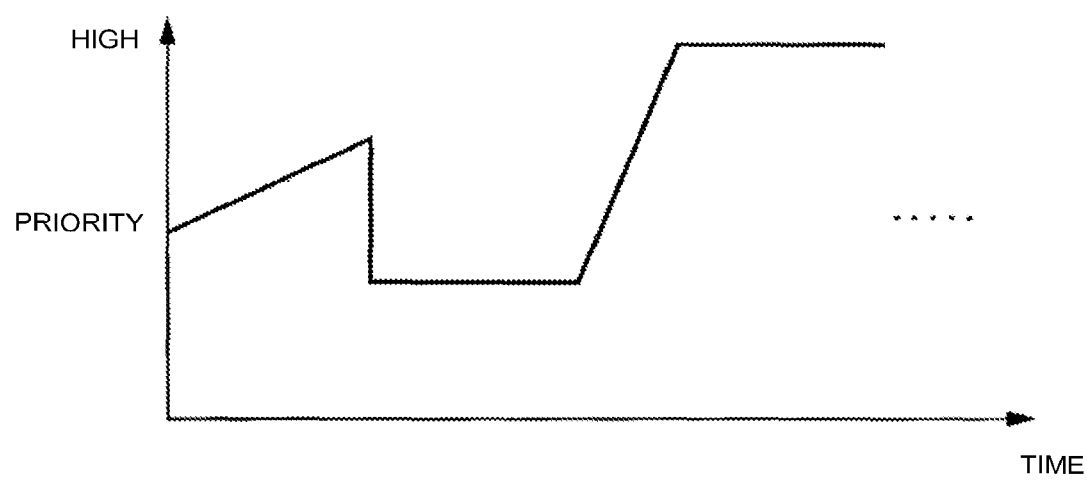
FIG. 12 is a diagram showing an exemplary relationship between a lapse of time and priority.

In the processing in step S208, the address recognition control unit 27 may determine the priority based on the elapsed time of the recognition processing of the OCR unit 28. It is thereby possible to reduce a load of the processing for calculating the priority. FIG. 12 is a diagram showing an exemplary relationship between a lapse of time and the priority. For example, the priority is stored in the address recognition storage unit 29 in association with an elapsed time of the recognition processing, and the address recognition control unit 27 may determine the priority based on the elapsed time of the recognition processing and the information stored in the address recognition storage unit 29. The OCR unit 28 performs different processing at each time in some cases. For this reason, as shown in FIG. 12, the priority changes linearly or non-linearly with the elapsed time of execution of the recognition processing by the OCR unit 28.

According to the above-described embodiment, the need of the user can be met while reducing the size of the apparatus by providing the recognition unit (26, 27) for performing processing for recognizing information provided on a delivery target item based on an image obtained by image-capturing performed by the image capturing unit (14) for capturing the image of the delivery target item, and the determination unit (26, 28) for determining whether or not to extend the recognition processing performed by the recognition unit based on the degree of progress of the recognition processing that has been performed by the recognition unit in a period from when the information recognition processing was started by the recognition unit until the predetermined time has elapsed, and on the extension rate that indicates the ratio of the number of times that the recognition unit has extended the recognition processing.

This embodiment can also be expressed as follows.

A delivery processing apparatus including:

a recognition unit for performing recognition processing for recognizing information provided on a delivery target item by performing OCR processing on an image obtained by image-capturing performed by an image capturing unit for capturing an image of the delivery target item; and a determination unit for determining that the recognition processing performed by the recognition unit is extended if a degree of progress of the recognition processing performed by the recognition unit is between a first reference value and a second reference value in a period from when the recognition processing was started by the recognition unit until a predetermined time has elapsed, and an extension rate that indicates a ratio of the number of times that the recognition unit has extended the recognition processing is smaller than or equal to a set value.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Although an embodiment of the present invention has been described, this embodiment is proposed as an example, and is not intended to limit the scope of the invention. This embodiment can be carried out in various other modes, and omission, replacement, and modification can be made in various forms without departing from the gist of the invention. The embodiment and modifications thereof are encompassed in the scope and the gist of the invention, and are also encompassed in the invention described in the claims and the equivalents thereof.

What is claimed is:

1. A delivery processing apparatus comprising:
   a recognition unit which performs recognition processing for recognizing information provided on a delivery target item based on an image obtained by capturing the image of the delivery target item; and
   a determination unit which determines whether or not to extend the recognition processing performed by the recognition unit based on a degree of progress of the recognition processing that has been performed by the recognition unit in a period from when the recognition processing was started by the recognition unit until a predetermined time has elapsed, and an extension rate that indicates a ratio of the number of times that the recognition unit has extended the recognition processing to the number of times that the recognition unit has performed the recognition processing.

2. The delivery processing apparatus according to claim 1, wherein if the degree of progress is smaller than a first reference value and is larger than or equal to a second reference value that is lower than the first reference value, and the extension rate is smaller than a set value, the determination unit extends the recognition processing performed by the recognition unit.

3. The delivery processing apparatus according to claim 1, wherein if the degree of progress is smaller than a second reference value that is lower than a first reference value, the determination unit determines to stop the recognition processing performed by the recognition unit and transmit the image to an external apparatus for assisting the recognition processing by means of a visual check of a human.

4. The delivery processing apparatus according to claim 1, wherein if the degree of progress is smaller than a first reference value and is larger than or equal to a second reference value that is lower than the first reference value, and the extension rate is larger than or equal to a set value, the determination unit determines to stop the recognition processing performed by the recognition unit and transmit the image to an external apparatus for assisting the recognition processing by means of a visual check of a human.

5. The delivery processing apparatus according to claim 1, further comprising:
   a display which displays an image,
   wherein the determination unit is configured to cause the display to display the extension rate.

6. The delivery processing apparatus according to claim 1, further comprising:
   an input unit which receives a change of a set value for the extension rate,
   wherein the determination unit is configured to determine whether or not to extend the recognition processing performed by the recognition unit based on the set value of the extension rate received with the input unit.

7. The delivery processing apparatus according to claim 1, wherein a plurality of the recognition units are provided, and the determination unit is configured to monitor a recognition processing status of the plurality of recognition units, and if a new recognition processing request is made and the number of recognition units that are performing the recognition processing is equal to an upper limit number of recognition units, the determination unit calculates a priority of each of the recognition units, causes the recognition processing of a recognition unit having a lowest priority to be stopped, and causes new recognition processing to be started.

8. The delivery processing apparatus according to claim 1, further comprising:

a storage which stores the number of times of the recognition processing that has been performed by the recognition unit and the number of times that the recognition unit has extended the recognition processing.

9. The delivery processing apparatus according to claim 1, wherein the recognition unit is configured to output information indicating the degree of progress of the recognition processing.

10. The delivery processing apparatus according to claim 1, wherein the degree of progress is indicated by a score of the recognition processing calculated using a predetermined calculation method.

11. A method for recognizing information provided on a delivery target item, comprising:

executing recognition processing for recognizing the information provided on the delivery target item based on an image obtained by capturing the image of the delivery target item;

obtaining a degree of progress of the recognition processing in a period from when the recognition processing was started until a predetermined time has elapsed;

obtaining an extension rate indicating a ratio of the number of times that the recognition processing has been extended to the number of times that the recognition processing has been executed;

determining whether or not to extend the recognition processing based on the degree of progress obtained and the extension rate obtained; and extending the recognition processing so as to be longer than the predetermined time if it is determined to extend the recognition processing.

12. The method for recognizing information provided on a delivery target item according to claim 11, wherein in the determining of whether or not to extend the recognition processing, it is determined to extend the recognition processing if the degree of progress is smaller than a first reference value and is larger than or equal to a second reference value that is lower than the first reference value, and the extension rate is smaller than a set value.

\* \* \* \* \*